US011739550B2

(12) United States Patent
Afshar

(10) Patent No.: US 11,739,550 B2
(45) Date of Patent: Aug. 29, 2023

(54) MULTI-FUNCTION POOL SKIMMER WATER TREATMENT DEVICE

(71) Applicant: Asia Connection LLC, New York, NY (US)

(72) Inventor: Reza Afshar, Westlake Village, CA (US)

(73) Assignee: ASIA CONNECTION LLC, New York, NY (US)

( * ) Notice: Subject to any disclaimer, the term of this patent is extended or adjusted under 35 U.S.C. 154(b) by 230 days.

(21) Appl. No.: 16/704,057

(22) Filed: Dec. 5, 2019

(65) Prior Publication Data

US 2021/0172188 A1  Jun. 10, 2021

(51) Int. Cl.
| | |
|---|---|
| E04H 4/12 | (2006.01) |
| C02F 1/00 | (2006.01) |
| C02F 1/40 | (2006.01) |
| C02F 1/68 | (2006.01) |
| B01D 29/13 | (2006.01) |
| C02F 103/42 | (2006.01) |

(52) U.S. Cl.
CPC .......... *E04H 4/1281* (2013.01); *B01D 29/13* (2013.01); *C02F 1/004* (2013.01); *C02F 1/40* (2013.01); *C02F 1/685* (2013.01); *E04H 4/1272* (2013.01); *C02F 2103/42* (2013.01); *C02F 2303/04* (2013.01)

(58) Field of Classification Search
CPC .. C02F 1/004; C02F 1/40; C02F 1/685; C02F 2103/42; C02F 2303/04; C02F 1/00; C02F 1/68; C02F 1/4676; C02F 1/76; C02F 1/688; C02F 1/687; B01D 29/13; B01D 29/58; B01D 29/35; B01D 37/025; E04H 4/1281; E04H 4/1272; E04H 4/12
USPC ........................................................ 210/764
See application file for complete search history.

(56) References Cited

U.S. PATENT DOCUMENTS

| | | | | |
|---|---|---|---|---|
| 5,234,588 | A * | 8/1993 | Aymes .................... | B01F 21/22 210/206 |
| 5,888,386 | A * | 3/1999 | Enright .................. | C02F 1/688 210/232 |
| 8,168,065 | B1 * | 5/2012 | Gavigan .................. | C02F 1/76 210/167.11 |
| 2002/0020676 | A1 * | 2/2002 | King ..................... | B01F 25/312 210/753 |
| 2015/0247332 | A1 * | 9/2015 | Norberto, III ........ | E04H 4/1263 210/167.2 |
| 2015/0354242 | A1 * | 12/2015 | Saccoccio .............. | B01D 29/50 210/806 |

* cited by examiner

Primary Examiner — Akash K Varma
(74) Attorney, Agent, or Firm — DILWORTH & BARRESE, LLP

(57) ABSTRACT

A water treatment insert for a pool skimmer system includes a chemical treatment portion separated from a mechanical filtration portion. The treatment device includes an upper portion and a lower portion. The upper section can include a vertical wall or walls, which should be substantially watertight so that substantially all the water entering the pool skimmer flows through the upper portion, and then into the lower section. The entire device is preferably received in the filter basket receiving section of a conventional pool skimmer, in place of the conventional filter basket. One of the upper and lower sections provides mechanical filtration and the other chemical treatment, to enhance the water treatment function of the skimmer.

13 Claims, 7 Drawing Sheets

MULTI-FUNCTION POOL SKIMMER WATER TREATMENT DEVICE

TECHNICAL FIELD

The present disclosure relates generally to swimming pool skimmers and more particularly, to a water treatment device for use in a pool skimmer system.

BACKGROUND

Most swimming pools employ a system of several skimmers that filter large debris, such as leaves and insects that are floating on the surface of a swimming pool. The water will enter each skimmer from the pool surface, typically spilling over a weir, which receives water from the surface only, to maximize surface water flow speed.

A pool skimmer 100, in accordance with the prior art, is shown generally in FIG. 1. Skimmer 100 includes an upper inlet portion 110, which includes a surface inlet portion 115 that receives surface water from the swimming pool. The water from the pool spills over a floating weir 116, which insures that only a thin upper layer of pool water enters inlet portion 115 and increases flow from the surface.

Skimmer 100 also includes a filter basket receiving portion 120, which typically includes a removable filter basket 125. A pool owner or maintenance worker will typically open a lid at a top 111 of upper inlet portion 110 and reach down into filter basket receiving portion 120 and remove basket 125 with the debris trapped therein. Any debris collected in basket 125 can be removed and discarded and basket 125 is replaced back in filter basket receiving portion 120.

Water flowing through and therefore filtered by basket 125 enters a bottom portion 128 of skimmer 100 and then exits skimmer 100 through a bottom drain 130.

While useful for removing large debris from the surface of the swimming pool, pool skimmers do not satisfy their potential for serving a greater role in the overall pool water treatment process. For example, most skimmers are not suitable for providing sanitizer or cathodic protection materials and keeping those materials separate from the debris that needs to be removed from the filter basket.

Accordingly, it is desirable to provide an improved multi-function skimmer system, which overcomes drawbacks in the prior art.

SUMMARY OF THE INVENTION

Generally speaking, in accordance with the invention, an improved pool skimmer system is provided, which includes a water treatment device for inclusion in the filter basket receiving portion of a pool skimmer. The water treatment device includes a chemical treatment portion separated from a mechanical filtration portion. The treatment device can include an upper section and a lower section for separating the chemical treatment portion from the mechanical filtration portion. The upper section can include a vertical wall structure, which should be substantially watertight, so that all the water entering the skimmer flows into and through the upper section, then into and through the lower section. The entire device is preferably received in the filter basket receiving section of a conventional pool skimmer, and can take the place of a conventional filter basket.

The mechanical filter portion of the water treatment device can include a basket filter, preferably in the upper section, spaced away from the upper walls of the water treatment device, to permit water to flow out of the sides and bottom of the basket to promote high water flow volumes. The basket should be constructed for trapping large debris that had been floating on the surface of the swimming pool and permitting a high water flow through the water treatment device.

The lower section of the water treatment device can hold chemical substances, such as water sanitizer or corrosion or cathodic protection materials. The lower section is preferably constructed to promote sufficient residence time of the water with the chemicals, while permitting a high flow of water over the chemical substances and then out of the lower section, into the skimmer drain.

Baskets in accordance with the invention are preferably secured to the treatment device and should ensure that all or almost all the water entering the treatment device flows through the basket. It is also preferable that the entire water treatment device can be removed as a single unit, with a single handle or grip structure. The device is preferably constructed to selectively remove the basket only. The water treatment device should be constructed to physically separate the water treatment materials from any debris trapped in the filter basket. Therefore, the filter basket should be easily removable from the treatment device, so that it can be emptied without the need for a user to remove and/or come into contact with the chemicals in the treatment portion.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which.

Throughout the disclosure, like reference numerals will be used to indicate similar elements. The dimensions are not necessarily to scale. These figures should not be considered as limiting.

DETAILED DESCRIPTION OF PREFERRED EMBODIMENTS

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

Figure 1:
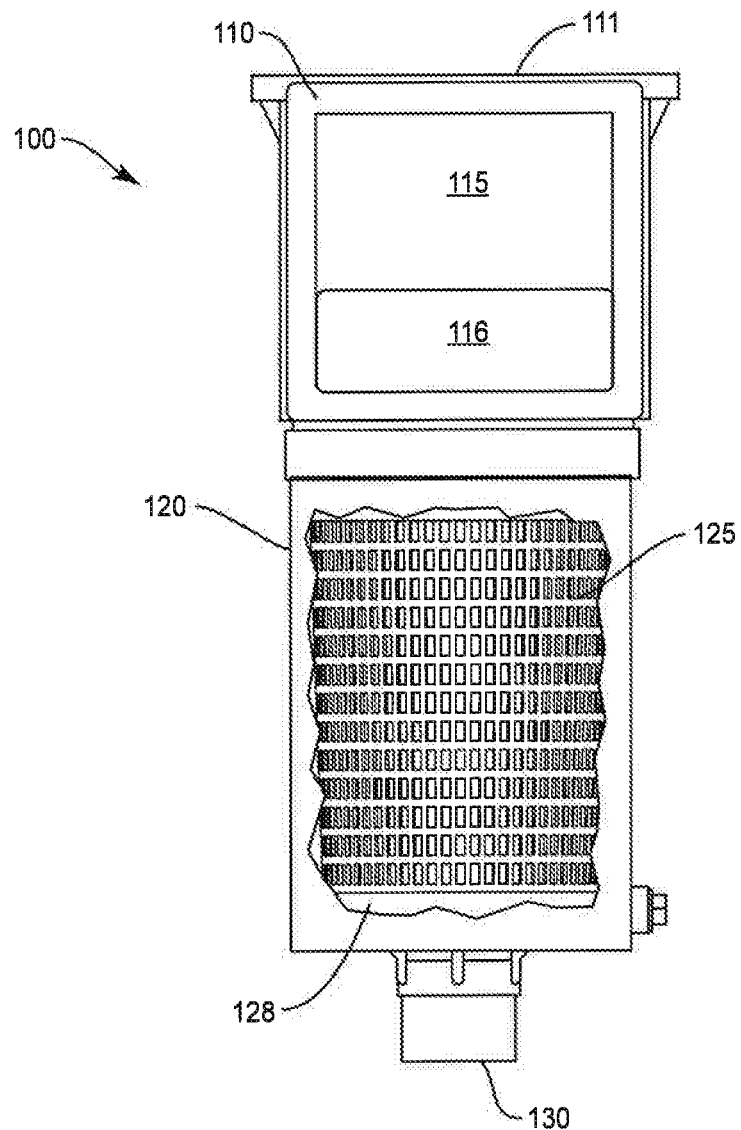
FIG. 1 is a partial cut-out side view of a conventional pool skimmer.
Figure 2:
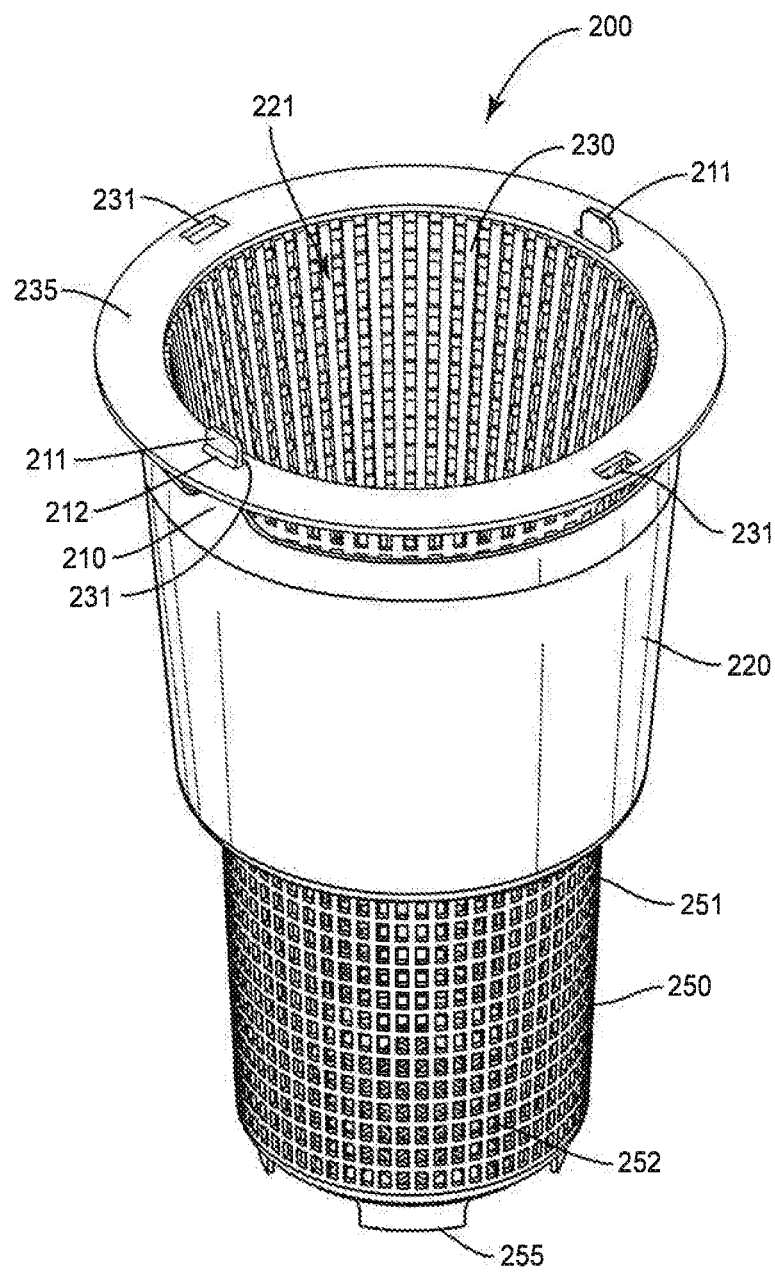
FIG. 2 is a perspective view of a multifunction water treatment device in accordance with a preferred embodiment of the invention.
Figure 3:
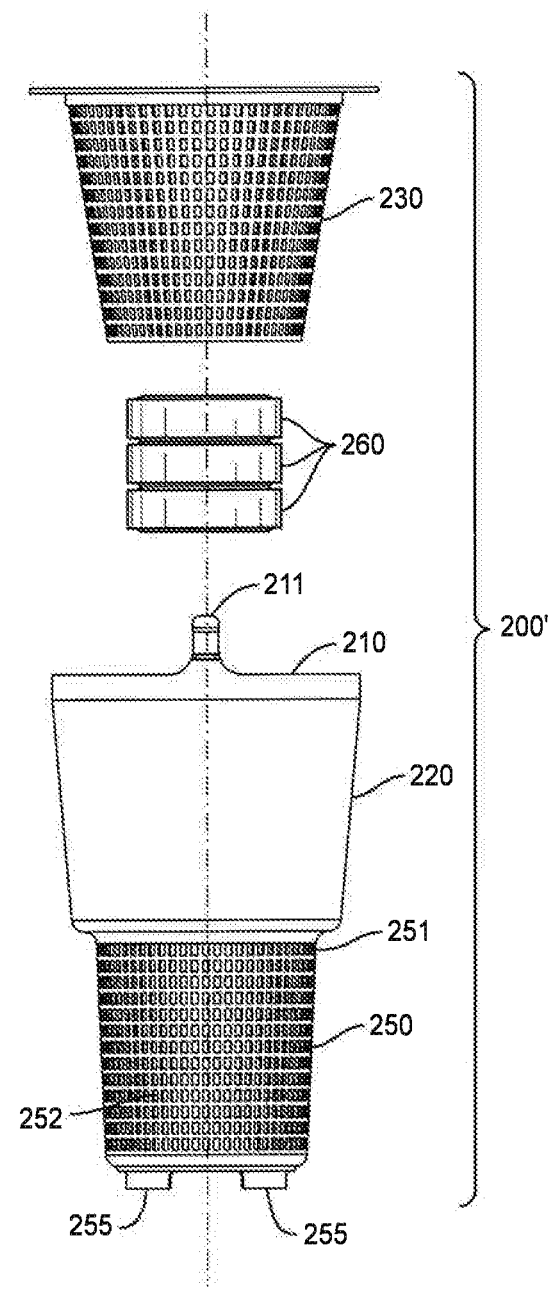
FIG. 3 is an exploded side view of the water treatment device of FIG. 2 in accordance with one embodiment of the invention.
Figure 4:
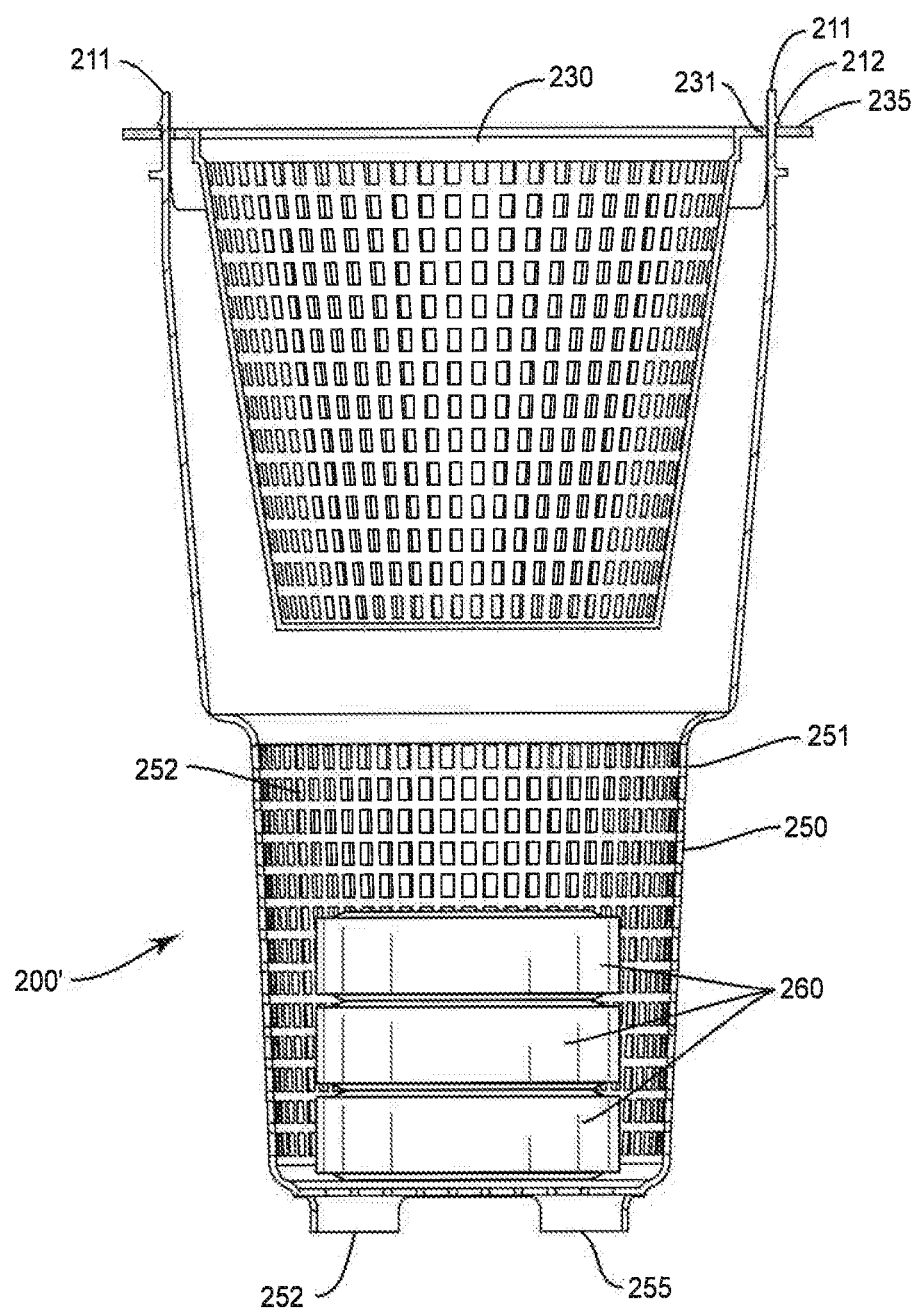
FIG. 4 is a side partial cross-sectional view of the water treatment device of FIG. 3.

A water treatment device 200 for installation into the filter basket receiving portion of a swimming pool skimmer is shown generally in FIGS. 2-4. Water treatment device 200 includes a housing 210 having an upper mechanical filtration portion 220 and a lower chemical treatment portion 250. A filter basket 230 nests in mechanical filtration portion 220. Filter basket 230 is spaced apart from a wall structure of upper portion 220 to promote water flow out the sides of basket 230.

Figure 8:
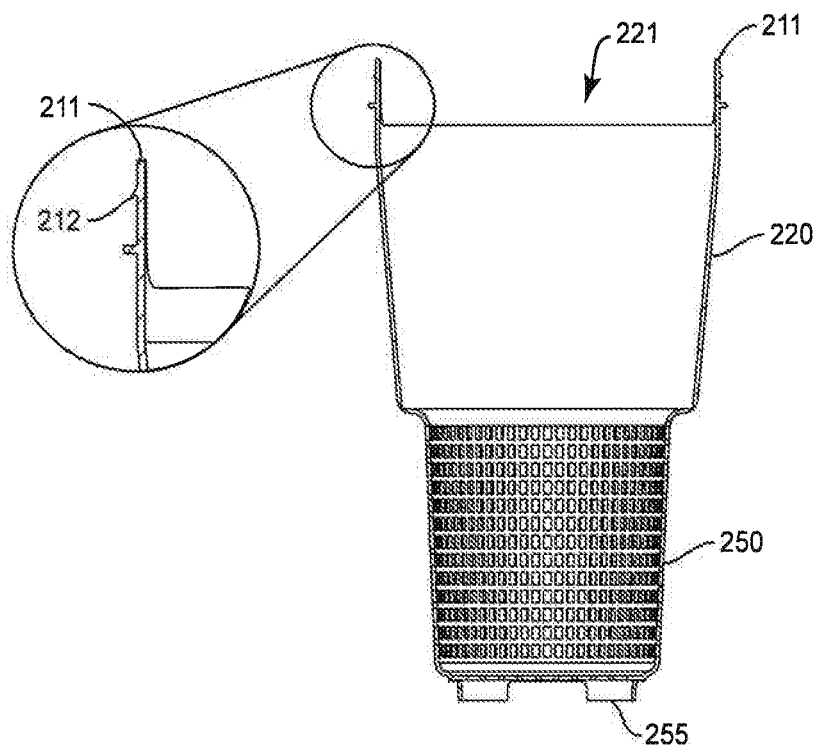
FIG. 8 is a cross-sectional side view of a housing for the water treatment device of FIG. 2.

The upper rim of upper mechanical filtration portion 220 includes a pair of security tabs 211. Tabs 211 should be resilient, so that hand pressure can deform them inwardly or outwardly. As shown in the enlarged portion of FIG. 8, tabs 211 include a hook portion 212. The upper surface of hooks 212 is inclined, to serve as a camming surface.

Upper portion 220 of housing 210 also includes an open water receiving portion 221 as defined by a substantially watertight cylindrical wall structure, which houses and supports basket 230. Basket 230 includes an upper rim 235. Upper rim 235 rests on a shoulder of the pool skimmer that ordinarily supports the filter basket (not shown), to ensure that substantially all the water flowing into the skimmer flows into basket 230. Rim 235 includes a plurality of open slots 231. To install filter basket 230 into water receiving portion 221 of upper portion 220, basket 230 is inserted into water receiving portion 221, such that open slots 231 fit over tabs 211. As basket 230 is urged downward into water receiving portion 221, rim 235 engages the upper surface of hooks 212 and acts to displace them inward, in a camming fashion, until basket 235 clicks in place over tabs 211 and is thereby releasably secured to housing 210. Other releasable attachment structures are acceptable and would be known to those in the art.

Due to the releasable attachment between basket 230 and housing 210, basket 230 can be easily removed and cleaned out, while the remainder of housing 210 remains in the pool skimmer. Alternatively, the entire water treatment device can be removed as a unit. A handle (not shown) or other gripping structure (not shown) can be provided on basket 230, housing 210 or both.

Referring for example, to FIGS. 4-6 and 8, lower chemical treatment portion 250 of housing 210 is located below and separate from basket 230. An upper end 251 of lower portion 250 is open, and receives water after it flows through basket 230. In this manner, any debris caught by basket 230 is kept separate from lower portion 250.

Referring to FIG. 3 or 4, lower portion 250 is open, and configured to receive different types of chemical water treatment products. For example, a water treatment device 200' includes a plurality of water treatment tablets 260. Tablets 260 can provide chlorine, mineral or other treatment to water flowing through the pool skimmer.

Figure 5:
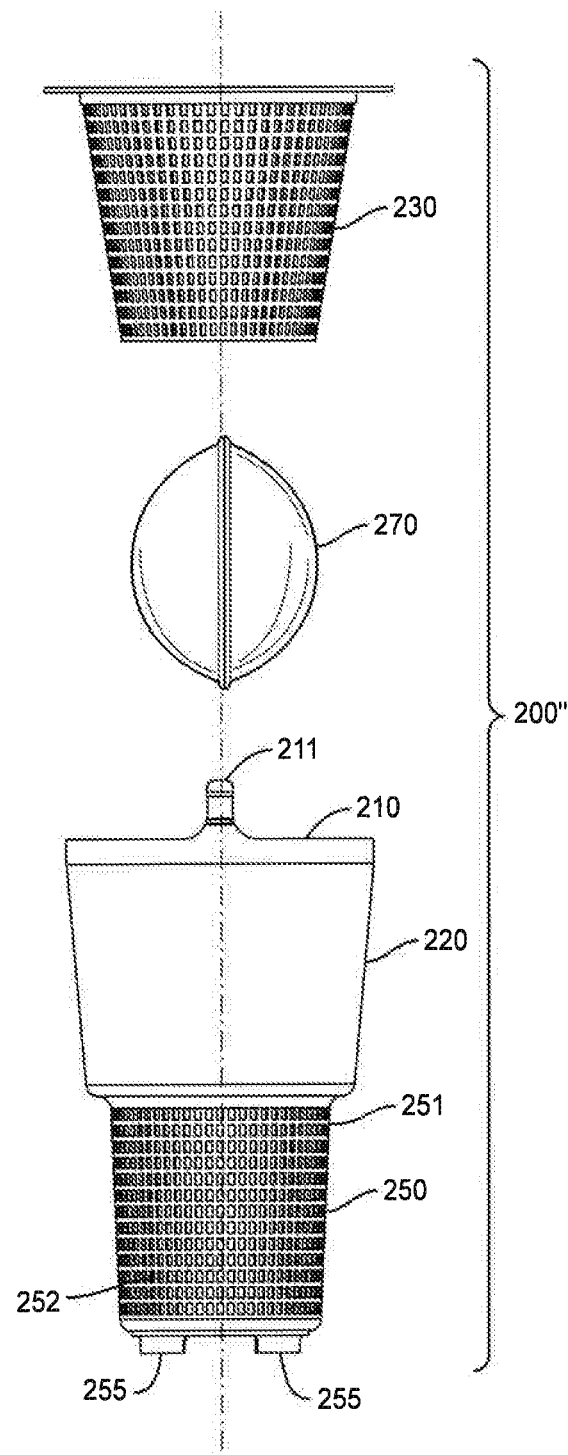
FIG. 5 is an exploded side view of a water treatment device similar to the device of FIG. 2, in accordance with another embodiment of the invention.
Figure 6:
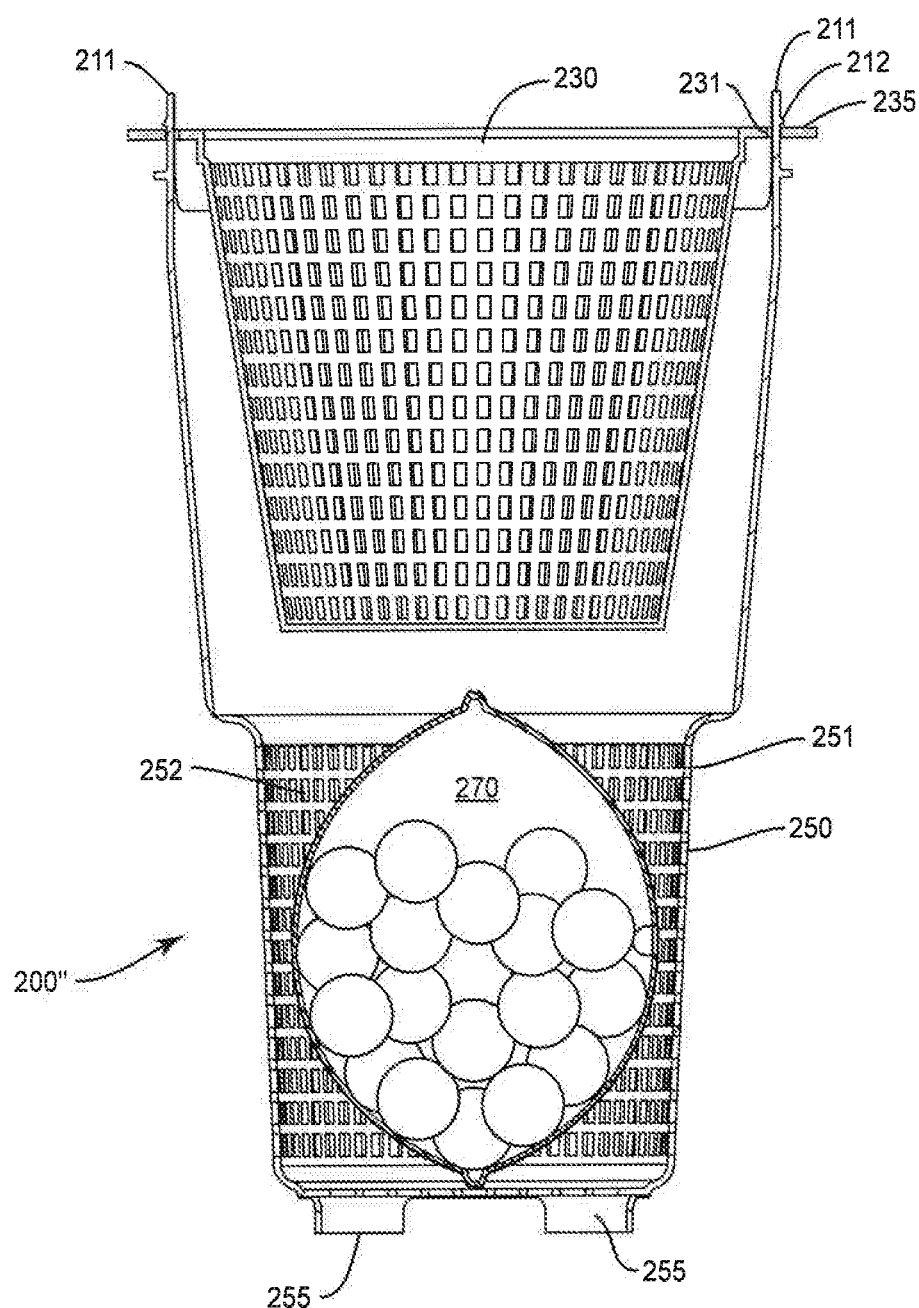
FIG. 6 is a partial cross-sectional side view of the water treatment device of FIG. 5.
Figure 7:
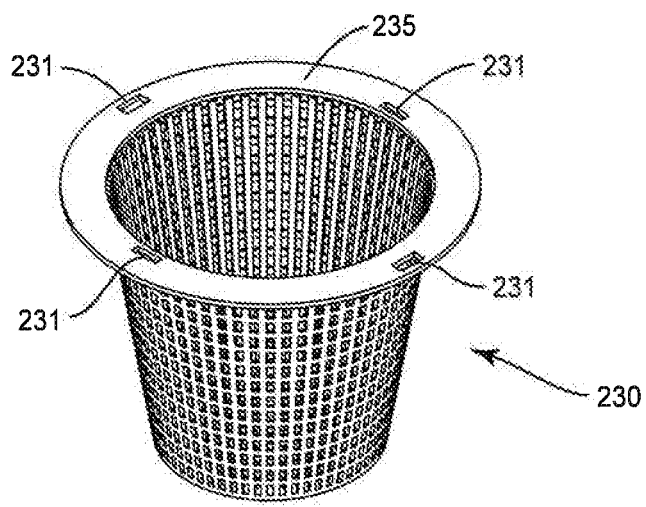
FIG. 7 is a perspective view of the basket portion of the water treatment device of FIG. 2.

Referring to FIGS. 5 and 6, a water treatment device 200" includes a porous chemical ball 270, designed to leach chemicals into the water flowing over ball 270. For example, ball 270 can include minerals such as zinc or magnesium and provide for cathodic protection to devices coming into contact with the pool water. Such balls, sanitizing chemicals and chemicals providing for cathodic protection are known to those familiar with swimming pool systems.

Lower chemical treatment portion 250 includes a plurality of openings 252 and can have the construction of a basket-type structure. In an embodiment of the invention, it is releasably secured to housing 210. In addition, lower portion 250 includes a plurality of feet 255 to raise the bottom of lower chemical treatment portion 250 off the bottom of the skimmer, to enhance waterflow out the entire bottom of lower portion 250.

A water treatment device in accordance with the invention should be sized and configured to be received in the filter basket receiving portion of a conventional pool skimmer that ordinarily retains the debris collection basket and to ensure that substantially all the water entering the pool skimmer flows through the water treatment device.

Rim 235 of basket 230 should have an outer diameter of about 6.5 to 8.0 inches, preferably about 7 to 8 inches, most preferably about 7.1 to 7.4 inches. Basket 230 should have a height of about 4 to 7 inches, more preferably about 5 to 6 inches, most preferably about 5 to 5.5 inches. Basket 230 should have an outer diameter set inward from the inner diameter of the upper portion of housing 210, to permit water to flow from the sides and the bottom of basket 230.

Housing 210 should fit within the dimensions of the filter basket receiving portion of a conventional pool skimmer. It should have a height of about 9 to 14 inches, preferably about 10 to 12 inches, most preferably about 11 to 12 inches, from the bottom of feet 255 to the top of tabs 211. Bottom portion 250 should be spaced from the walls of the filter basket receiving portion of a pool skimmer. It should have an outer diameter within the inner diameter of the pool skimmer. The outer diameter of bottom portion 250 should be less than about 5 inches, preferably about 4 to 3 inches.

It is also acceptable to switch the functions of the upper and lower portions of water treatment device 200. For example, it is acceptable to include the section storing the chemical treatment materials in the upper section of the housing and to include the mechanical straining function below the chemical treatment materials. It has been determined that it is advantageous to keep these sections separate. Moreover, as discussed above, it is beneficial to be able to clean out the debris basket, without having to manipulate the chemical materials. Therefore, it is preferred to have the straining portion removably located above the chemical treatment portion, so that it can be removed and cleaned, while leaving the chemical treatment portion in place.

Water treatment devices in accordance with the invention are typically made from plastic, polymer and/or other resilient materials. The parts of a water treatment device in accordance with the invention should be strong enough to endure rough handling during removal and installation and should be inert to the various chemicals they may contain or encounter, such as chlorine, zinc, magnesium and various other salts, including seawater.

Please note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A water treatment device for treating water in a swimming pool skimmer, comprising:
    a housing configured to be located in a filter basket receiving portion of a swimming pool skimmer, the housing having an upper portion and a lower portion;
    the upper portion defined by an upper portion side wall, a debris collection basket is disposed in the upper portion, the debris collection basket having a basket side wall, spaced inward from the solid upper portion side wall, with a gap therebetween, and a basket bottom wall, the basket side wall and the basket bottom wall having a plurality of apertures adapted to permit water to flow therethrough, the housing and the debris collection basket are configured and arranged so that the water entering the upper portion flows through the debris collection basket, then into the lower portion and debris trapped by the debris collection basket is separated from the lower portion;
    the lower portion having a lower portion side wall and a lower portion bottom wall, the lower portion side wall and the lower portion bottom wall provided with a plurality of apertures to permit the water from the lower portion to flow out therethrough, the lower portion bottom wall having at least one foot portion adapted to raise the lower portion bottom wall above a bottom of the filter basket receiving portion of the swimming pool skimmer, the lower portion configured to house at least one or more water treatment chemicals for chemical treatment of the water passing through the lower portion.

2. The water treatment device of claim 1, wherein the debris collection basket is releasably secured to and removable from the upper portion.

3. The water treatment device of claim 1, wherein the debris collection basket has an upper rim at a top of the basket side wall and the upper rim is releasably secured to an upper section of the solid upper portion side wall.

4. The water treatment device of claim 3, wherein the upper section of the solid upper portion side wall includes upwardly extending resilient tabs having a camming engagement surface and the upper rim of the debris collection basket has openings configured to enter a camming engagement with the upwardly extending resilient tabs.

5. The water treatment device of claim 1, wherein the lower portion of the housing houses the at least one or more water treatment chemicals.

6. The water treatment device of claim 5, wherein the at least one or more water treatment chemicals provide sanitizing treatment or cathodic protection treatment to the water flowing through the housing.

7. The water treatment device of claim 1, wherein the solid upper portion side wall is substantially cylindrical and the basket side wall is tapered inward from the solid upper portion side wall as the basket side wall extends downward into the upper portion.

8. The water treatment device of claim 1, wherein the debris collection basket has an upper rim configured to rest on an upper edge of the swimming pool skimmer.

9. The water treatment device of claim 1, wherein the debris collection basket has an upper rim having an outer diameter of about 7 to 8 inches.

10. The water treatment device of claim 1, wherein the debris collection basket has a height of about 4 to 7 inches.

11. The water treatment device of claim 9, wherein an overall height of the housing is about 9 to 14 inches.

12. The water treatment device of claim 9, wherein the lower portion of the housing has an outer diameter of about 3 to 4 inches.

13. The water treatment device of claim 4, wherein the solid upper portion side wall consists essentially of a watertight cylindrical wall.

* * * * *